(12) United States Patent
Katou et al.

(10) Patent No.: US 7,394,138 B2
(45) Date of Patent: Jul. 1, 2008

(54) CAPACITANCE-TYPE DYNAMIC-QUANTITY SENSOR AND MANUFACTURING METHOD THEREFOR

(75) Inventors: Kenji Katou, Chiba (JP); Minoru Sudou, Chiba (JP); Hitsuo Yarita, Chiba (JP)

(73) Assignee: Seiko Instruments Inc. (JP)

( * ) Notice: Subject to any disclaimer, the term of this patent is extended or adjusted under 35 U.S.C. 154(b) by 406 days.

(21) Appl. No.: 10/848,285

(22) Filed: May 18, 2004

(65) Prior Publication Data

US 2004/0246648 A1    Dec. 9, 2004

(30) Foreign Application Priority Data

May 22, 2003    (JP)    ............................... 2003-144997

(51) Int. Cl.
*H01L 27/14* (2006.01)
(52) U.S. Cl. ...................... 257/414; 257/417
(58) Field of Classification Search .................. 257/414, 257/417, 418
See application file for complete search history.

(56) References Cited

FOREIGN PATENT DOCUMENTS

JP    08-094666    *    4/1996

* cited by examiner

*Primary Examiner*—Jack Chen
(74) *Attorney, Agent, or Firm*—Adams & Wilks

(57) ABSTRACT

A capacitance-type dynamic-quantity sensor has a silicon substrate having etched recessed upper and lower surface portions forming a weight supported by beam portions and mounted to undergo displacement due to an applied external dynamic quantity such as acceleration or angular velocity. An upper glass substrate is bonded to a part of the upper surface of the silicon substrate and is laminated with a first fixed electrode disposed opposite to and spaced apart from the weight with a first space therebetween formed by the etched recessed upper surface portion of the silicon substrate. A lower glass substrate is bonded to a part of the lower surface of the silicon substrate and is laminated with a second fixed electrode disposed opposite to and spaced apart from the weight with a second space therebetween formed by the etched recessed lower surface portion of the silicon substrate.

2 Claims, 5 Drawing Sheets

CAPACITANCE-TYPE DYNAMIC-QUANTITY SENSOR AND MANUFACTURING METHOD THEREFOR

BACKGROUND OF THE INVENTION

1. Field of the Invention

The present invention relates to a capacitance-type dynamic-quantity sensor for detecting a dynamic physical quantity such as acceleration or angular velocity by detecting a change in capacitance, which accompanies any displacement of a structure manufactured by using a semiconductor process, and to a manufacturing method therefor.

2. Description of the Related Art

Up to now, there has been known an electrostatic capacitance-type dynamic-quantity sensor. As regards such a sensor, a weight displaced according to externally applied acceleration or angular velocity, and a beam for supporting the weight are formed inside a semiconductor substrate to detect a change in electrostatic capacitance between a movable electrode of the weight and a fixed electrode formed at a minute interval from the movable electrode. (refer to JP 08-094666 A, for example). FIG. 5 is a schematic diagram thereof. In this sensor, weights 51 and beams 52 are formed inside a semiconductor substrate 53 through microprocessing. Glass substrates (an upper substrate 54 and a lower substrate 55) are bonded together from both sides thereof to seal the weights 51 and the beams 52. For such bonding, generally adopted is anodic bonding or eutectic bonding with a high reliability from the viewpoint of air-tightness or vacuum sealing. On account of bonding at about 300 to 400° C., glass is used, which contains metal to such a degree that its thermal expansion coefficient matches with that of the semiconductor substrate lest thermal strain should occur after the whole is cooled down to the room temperature. Etching such glass containing a large amount of metal allows formation of minute spaces 56 and 57. Fixed electrodes 58 are obtained by forming metal films within the minute spaces 56 and 57 defined by etching.

However, with the method as disclosed in JP 08-094666A, because of a large number of metal ions in the glass substrate, which function to equalize the thermal expansion coefficients of the glass substrate and the semiconductor substrate to each other, etching for forming the minute spaces involves a great deal of surface roughness on inner walls thereof. As a result, an etching depth for each minute space is hardly controlled, leading to a variation in detection sensitivity due to a variation in distance between the electrodes. In addition, the fixed electrode laminated on the rough surface easily peels off or undergoes disconnection, resulting in a reduction in sensor reliability.

SUMMARY OF THE INVENTION

In view of the above, according to the present invention, there is provided a capacitance-type dynamic-quantity sensor including: a silicon substrate having recesses in an upper surface and a lower surface thereof; a weight formed by etching a part of each of the recesses of the silicon substrate and displaced according to an externally applied acceleration and an externally applied angular velocity; an upper glass substrate bonded to a part of the upper surface of the silicon substrate and laminated with a first fixed electrode placed apart from the weight by a first space at a position opposite to the weight; and a lower glass substrate bonded to a part of the lower surface of the silicon substrate and laminated with a second fixed electrode placed apart from the weight by a second space at a position opposite to the weight.

Further, the silicon substrate may include a silicon substrate having a (100) plane orientation.

According to another aspect of the present invention, there is provided a manufacturing method for a capacitance-type dynamic-quantity sensor, including the steps of: forming a first recess in an upper surface of a silicon substrate; forming a second recess in a lower surface of the silicon substrate; forming a beam by processing the inside of the first recess; forming a weight supported by the beam by processing the inside of the second recess; laminating a substrate electrode for ensuring a potential of the weight; forming a through-hole in a flat upper glass substrate and a flat lower glass substrate; laminating a first fixed electrode on a lower surface of the upper glass substrate; laminating a second fixed electrode on an upper surface of the lower glass substrate; bonding the upper glass substrate to the upper surface of the silicon substrate such that the first fixed electrode is placed at a position opposite to the weight; and bonding the lower glass substrate to the lower surface of the silicon substrate such that the second fixed electrode is placed at a position opposite to the weight.

Further, the silicon substrate may include a silicon substrate having a (100) plane orientation.

DETAILED DESCRIPTION OF THE PREFERRED EMBODIMENT

Hereinafter, a description will be given of an angular velocity sensor representative of a dynamic-quantity sensor according to the present invention in detail with reference to the accompanying drawings.

Figure 1:
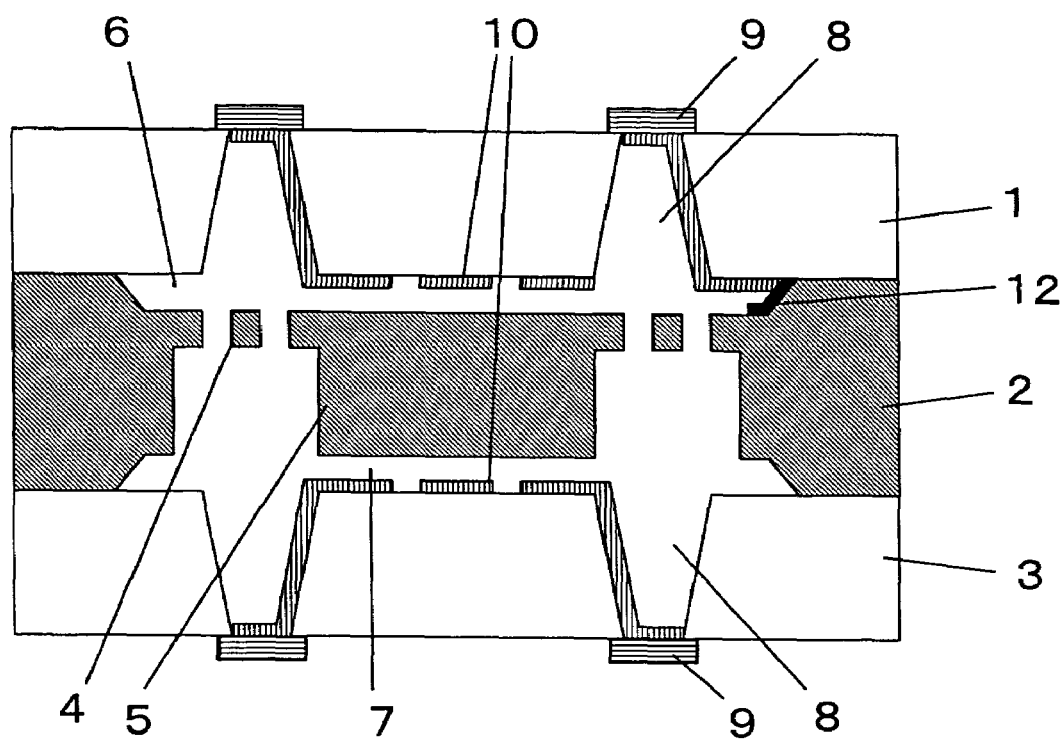
FIG. 1 is a schematic diagram illustrative of a capacitance-type dynamic-quantity sensor according to a first embodiment of the present invention.
Figure 2:
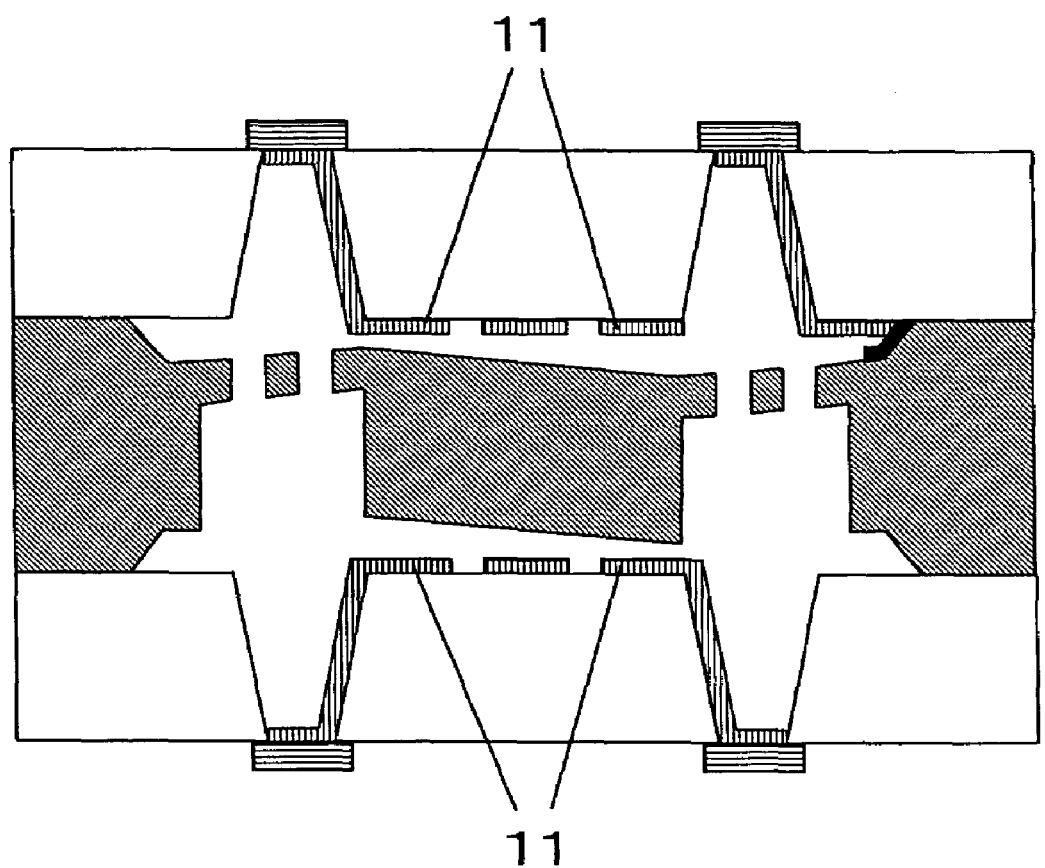
FIG. 2 is a schematic diagram illustrative of the capacitance-type dynamic-quantity sensor according to the first embodiment of the present invention.

To begin with, FIG. 1 is a sectional view of an angular velocity sensor according to a first embodiment of the present invention. The dynamic-quantity sensor of the present invention has a three-layer structure composed of: an upper glass substrate 1; a silicon substrate 2; and a lower glass substrate 3. The three substrates are bonded to one another to thereby constitute a structure. In the silicon substrate 2, an oscillator having a beam 4 and a weight 5 is formed through etching. An externally applied force enables the oscillator to oscillate or twist. Regarding a shape thereof, a thickness, length, or width of the beam 4, and a thickness or area of the weight 5 are designed such that arbitrary resonance frequency and spring constant are obtained. Minute spaces 6 and 7 between the oscillator and the glass substrates are defined by etching front and rear surfaces of the silicon substrate 2. Through-holes 8 are formed in part of the upper glass substrate 1 and the lower glass substrate 3 which sandwich the silicon substrate 2 having the oscillator integrated therein from above and below. The through-holes 8 each serve to lead out an electrode formed inside the glass substrate to the outside therethrough. A conductive material 9 is laminated on top of each through-hole 8 to thereby maintain air-tightness between the glass substrates. A fixed electrode formed inside each glass substrate is taken out to the outside with the conductive material 9 through a wiring formed on a side wall of each through-hole 8. This angular velocity sensor needs to control a potential of the silicon substrate 2 and ensures the potential of the silicon substrate 2 by bringing part of the electrode formed on an inner surface of the glass substrate into contact with a substrate electrode 12 formed in the silicon substrate 2. Now, an operation principle of this angular velocity sensor will be described below in brief. An AC voltage is applied to an excitation fixed electrode 10 provided on an inner surface side of each of the upper glass substrate 1 and the lower glass substrate 3. Thus, an electrostatic force acts between the fixed electrode and the oscillator (movable electrode) kept at a ground potential to oscillate the weight up and down. Provided that an angular velocity about a y-axis is applied to the oscillator applied with a velocity in a z-axis direction in this way, Coriolis acceleration equal to the product of the two velocities is applied in an x-axis direction. As shown in FIG. 2, this causes the beam to deform. A detection fixed electrode 11 is provided on an inner surface side of each of the upper glass substrate 1 and the lower glass substrate 3. The deformation of the beam results in the tilted weight. The tilt causes a change in capacitance between the detection fixed electrode 11 and the movable electrode. The objective angular velocity is detected based on this capacitance change.

As discussed above, in a capacitance detection type angular velocity sensor, a capacitance level directly reflects a distance between the fixed electrode and the movable electrode. Accordingly, if the distance varies, the electrostatic force acting between the excitation fixed electrode 10 and the movable electrode changes to cause variations in capacitance between the detection fixed electrode 11 and the movable electrode as well as in velocity of the vertical oscillation. This largely affects a detection sensitivity. A problem concerning such a sensitivity variation applies to not only the angular velocity sensor taken as an example but also all capacitance change detection type dynamic-quantity sensors such as an acceleration sensor and a pressure sensor. For reducing the variations, highly precise processing for the minute spaces is necessary.

In the angular velocity sensor according to the first embodiment of the present invention, the minute spaces 6 and 7 are defined by etching the silicon substrate 2 superior in processability to the glass substrate. For example, using an etchant with an anisotropic etching rate with respect to a plane orientation of silicon enables etching at a predetermined etching rate with respect to a specific plane orientation to offer a surface processed with little surface roughness, thereby allowing highly precise processing. In particular, it has been known that selecting a (100) plane offers a mirror-finished processed surface (reference: Sensor and Actuators 73, pp. 122-130, 1999). In the case of using a silicon wafer with the (100) plane orientation, a groove is formed while surrounded with four (111) planes, making it possible to stop etching at a given depth. This allows the formation of the spaces with a high precision, leading to a reduction in variation of the minute space. The electrode to be formed on an inner surface of the glass substrate is formed on the mirror-finished surface, by which peeling or disconnection hardly occurs. Thus, a more reliable dynamic-quantity sensor can be manufactured. Note that in etching silicon (Si), it is of course possible to define the minute spaces by dry processing or by using an isotropic etchant where an etching amount is easily controlled with little surface roughness.

Figure 3A:
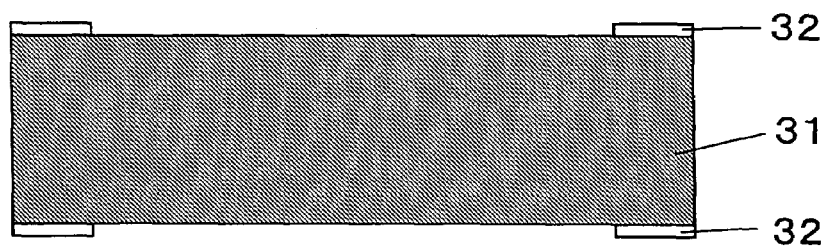
FIGS. 3A to 3E each illustrate a manufacturing process for a semiconductor substrate in the capacitance-type dynamic-quantity sensor according to the first embodiment of the present invention.

FIGS. 3A to 3E each show a manufacturing process for the angular velocity sensor according to the first embodiment of the present invention. First, as shown in FIG. 3A, etching masks 32 are formed on both sides of a silicon substrate 31 through photolithography. As a mask member, silicon oxide or silicon nitride is used but any other material may be used insofar as a film resistant to the etchant for the silicon is formed. In the case of using an oxide film, the mask member can be etched by use of hydrofluoric acid with ease, making it possible to obtain a mask pattern. Further, usable as the substrate is a silicon on insulator (SOI) substrate having an oxide film buried therein. In this case, an intermediate oxide film functions as an etching stop layer in processing the beam or weight, allowing highly precise processing with respect to its thickness.

Figure 3B:
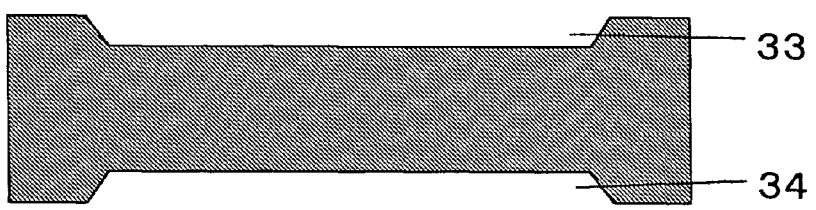

Next, as shown in FIG. 3B, recesses 33 and 34 for minute spaces are formed by etching the silicon substrate 31 from its both sides. Used as an etchant at this time is an anisotropic etchant such as a tetramethyl ammonium hydroxide aqueous solution or potassium hydroxide aqueous solution. On completion of etching, an etching mask is peeled off from the substrate by use of the hydrofluoric acid etc.

Figure 3C:
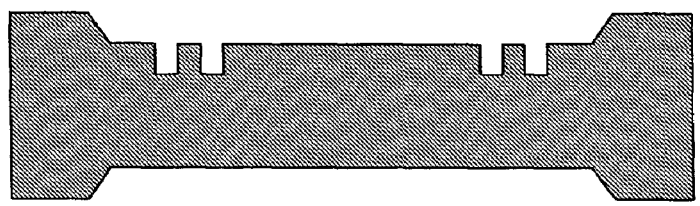

Subsequently, as shown in FIG. 3C, processing is carried out from the front side by dry etching such as reactive ion etching or inductive coupled plasma (ICP) etching into a beam shape. As an etching mask member, silicon oxide or silicon nitride may be used; a resist may be used instead. A high density plasma etching process utilizing ICP or electron cyclotron resonance plasma improves an etching rate as well as enables vertical processing with a higher precision, leading to an increase in oscillation characteristics of the beam and in addition, a reduction in production costs.

Figure 3D:
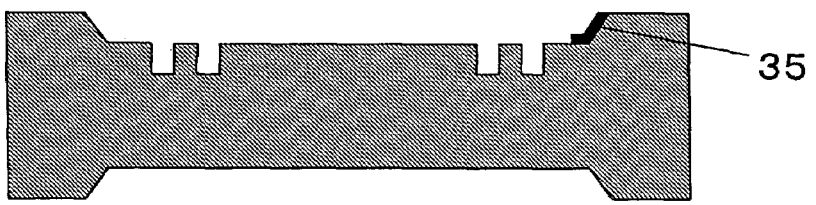

Next, as shown in FIG. 3D, a substrate electrode 35 is formed at an edge of the recess 33 for ensuring a weight potential. A material for the electrode may be either mono-metal or vari-metal.

Figure 3E:
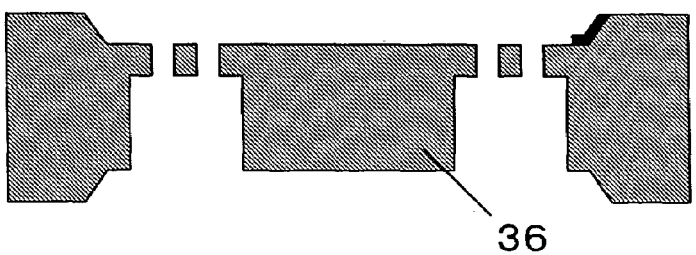

Then, as shown in FIG. 3E, the silicon substrate 31 is etched into a weight shape from its rear side by the high density plasma etching process. At this time, part of the substrate is perforated due to etching to form an oscillator 36.

In the case of using the SOI substrate, the intermediate oxide film is left. This left intermediate oxide film is then etched to thereby form the oscillator.

Next, FIGS. 4A to 4E each illustrate a manufacturing process for an upper glass substrate and a lower glass substrate. The upper glass substrate and the lower glass substrate have the same structure, and hence an explanation thereof is made with reference to the same figures.

Figure 4A:
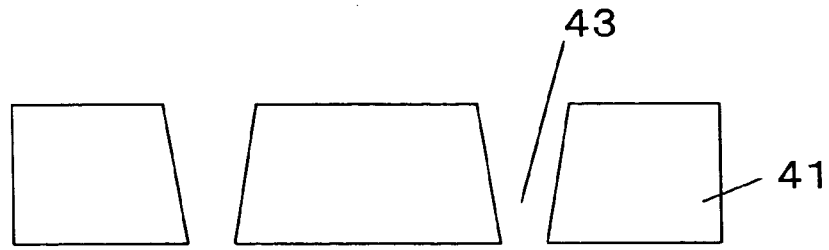
FIGS. 4A to 4E each illustrate a manufacturing process for an upper glass substrate and a lower glass substrate in the capacitance-type dynamic-quantity sensor according to the first embodiment of the present invention.
Figure 4B:
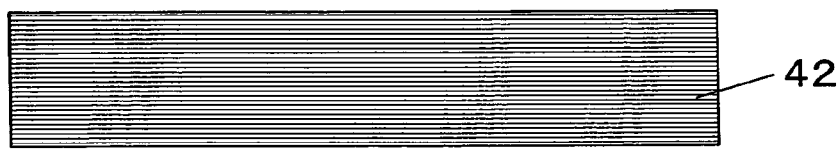

First, as shown in FIGS. 4A-4B a glass substrate 41 having a through-hole 43 formed therein and a high impurity concentration silicon substrate 42 are prepared. For the glass substrate, glass having a thermal expansion coefficient equal to that of silicon is selected. The through-hole 43 is formed by blast processing etc.

Figure 4C:
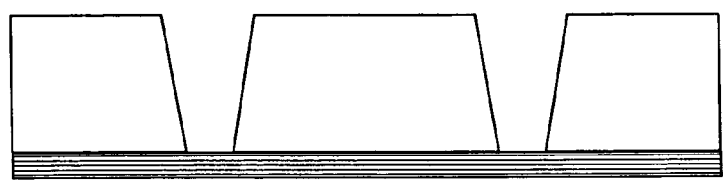

Subsequently, as shown in FIG. 4C, the glass substrate 41 (surface side with a smaller diameter of the through-hole) and the high impurity concentration silicon substrate 42 are bonded together, followed by polishing the high impurity concentration silicon substrate 42 into a thin substrate.

Figure 4D:
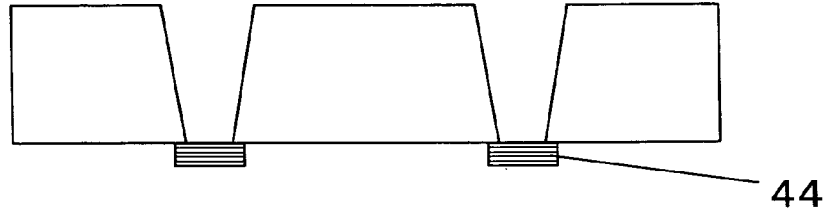

Next, as shown in FIG. 4D, the high impurity concentration silicon substrate 42 is etched to form an outer wiring 44 of each of the upper glass substrate and the lower glass substrate. The etching may be either dry etching or wet etching.

Figure 4E:
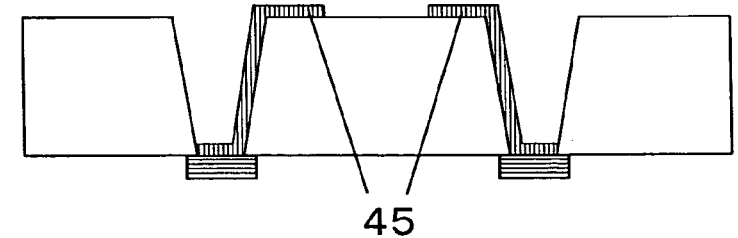
Figure 5:
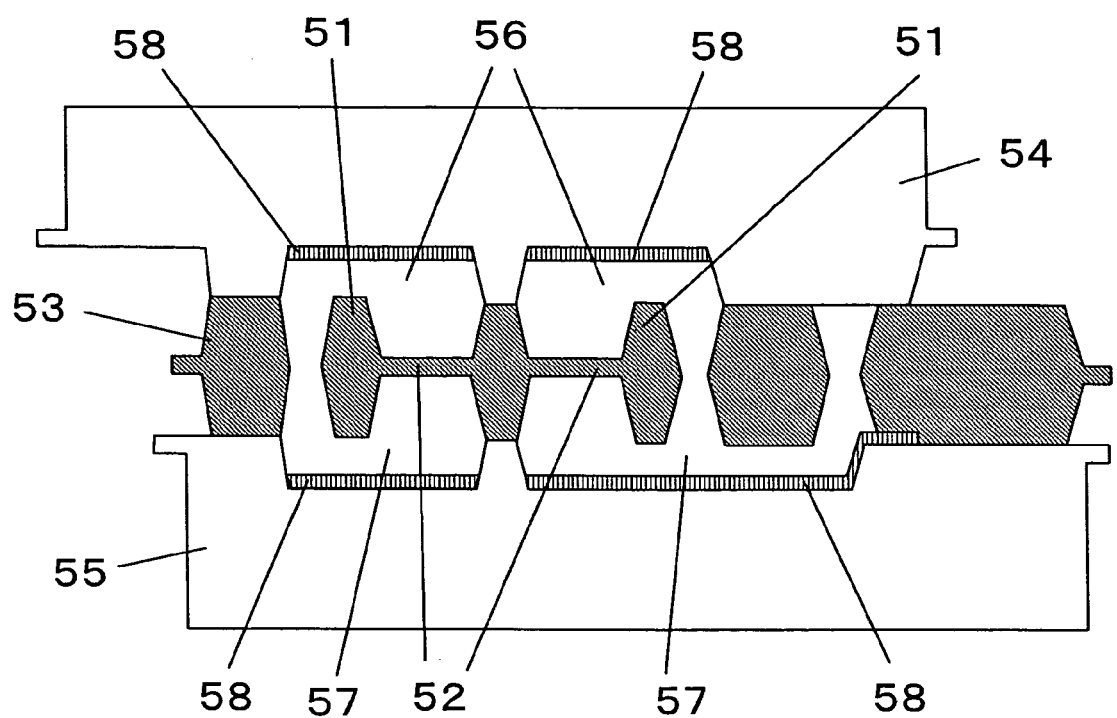
FIG. 5 is a schematic diagram illustrative of a conventional capacitance-type dynamic-quantity sensor.

Then, as shown in FIG. 4E, a metal film is laminated on the substrate from its surface side with a larger diameter of the through-hole for pattern formation. In this way, an inner wiring 45 is formed. After that, heat treatment is carried out to ensure a potential contact to the outer wiring 44.

Finally, although not shown in the figures, the upper glass substrate, the silicon substrate, and the lower glass substrate manufactured through the processes of FIGS. 3A to 4E are bonded to one another to seal the oscillator. As a result, the sensor structure as shown in FIG. 1 is realized. At this time, bonding is anodic bonding or eutectic bonding. The anodic bonding is performed by applying a negative voltage to the glass side and utilizing electrostatic attraction between glass and silicon. The eutectic bonding is performed by laminating metal on a bonding surface to bond the silicon and the glass together.

In the angular velocity sensor manufactured through the above processes, the substrate is processed at a time from its both sides in a step of processing the silicon substrate surface to form a gap as a minute space, whereby the number of processing steps can be reduced to attain a cost reduction effect.

In forming the minute spaces, highly precise processing is realized with little surface roughness by etching not the glass substrate but the silicon substrate. Consequently, a highly reliable dynamic-quantity sensor can be manufactured, which hardly undergoes peeling or disconnection with less variation in sensitivity. In addition, the processing proceeds from both sides at a time in the etching step for defining the minute spaces, whereby the number of steps can be reduced and a cost reduction can be achieved.

What is claimed is:

1. A capacitance-type dynamic-quantity sensor comprising:

a semiconductor substrate having a weight supported by beams and mounted to undergo displacement due to an applied external dynamic quantity such as acceleration or angular velocity;

an upper substrate having a first main surface, a second main surface opposite to the first main surface, a plurality of through-holes extending through the opposed first and second main surfaces so as to provide the first main surface with a plurality of surface portions lying in a common plane, and a first fixed electrode disposed on one of the surface portions of the first main surface so as to confront the weight with a first gap therebetween, at least one other of the surface portions of the first main surface being connected to a part of a first surface of the semiconductor substrate;

a lower substrate having a first main surface, a second main surface opposite to the first main surface, a plurality of through-holes extending through the opposed first and second main surfaces of the lower substrate so as to provide the first main surface of the lower substrate with a plurality of surface portions lying in a common plane, and a second fixed electrode disposed on one of the surface portions of the first main surface of the lower substrate so as to confront the weight with a second gap therebetween, at least one other of the surface portions of the first main surface of the lower substrate being connected to a part of a second surface of the semiconductor substrate opposite to the first surface thereof;

a conductive material disposed on the second main surface of each of the upper and lower substrates at a location corresponding to the through-holes; and a wiring disposed in each of the through-holes of the upper and lower substrates and electrically connecting the first and second fixed electrodes with the respective conductive materials.

2. A capacitance-type dynamic-quantity sensor according to claim 1; wherein the semiconductor substrate comprises a silicon substrate having a (100) plane orientation.

* * * * *

UNITED STATES PATENT AND TRADEMARK OFFICE
CERTIFICATE OF CORRECTION

PATENT NO. : 7,394,138 B2
APPLICATION NO. : 10/848285
DATED : July 1, 2008
INVENTOR(S) : Katou et al.

It is certified that error appears in the above-identified patent and that said Letters Patent is hereby corrected as shown below:

TITLE PAGE INVENTORS (ITEM 75):

Change "Hitsuo Yarita" to --Mitsuo Yarita--

Signed and Sealed this
Third Day of April, 2012

David J. Kappos
*Director of the United States Patent and Trademark Office*